US010662984B2

(12) United States Patent
Reidi et al.

(10) Patent No.: US 10,662,984 B2

(45) Date of Patent: May 26, 2020

(54) COMPRESSED AIR PREPARATION DEVICE AND METHOD FOR OPERATING SAME

(71) Applicant: KNORR-BREMSE SYSTEME FÜR SCHIENENFAHRZEUGE GMBH, Munich (DE)

(72) Inventors: Angelika Reidi, Munich (DE); Philipp Gehrke, Munich (DE); Christian Urra, Munich (DE); Thomas Merkel, Hürth (DE)

(73) Assignee: KNORR-BREMSE SYSTEMS FÜR SCHIENENFAHRZEUGE GMBH (DE)

( * ) Notice: Subject to any disclaimer, the term of this patent is extended or adjusted under 35 U.S.C. 154(b) by 0 days.

(21) Appl. No.: 15/772,948

(22) PCT Filed: Oct. 27, 2016

(86) PCT No.: PCT/EP2016/075889

§ 371 (c)(1),
(2) Date: May 2, 2018

(87) PCT Pub. No.: WO2017/076728

PCT Pub. Date: May 11, 2017

(65) Prior Publication Data

US 2018/0320716 A1 Nov. 8, 2018

(30) Foreign Application Priority Data

Nov. 2, 2015 (DE) ........................ 10 2015 118 744

(51) Int. Cl.

*F15B 21/048* (2019.01)
*B60T 17/00* (2006.01)

(Continued)

(52) U.S. Cl.

CPC .......... *F15B 21/048* (2013.01); *B60T 17/004* (2013.01); *F04B 49/065* (2013.01);

(Continued)

(58) Field of Classification Search

CPC ........... Y10T 137/86051; F15B 21/048; F15B 21/044; F15B 2211/615; F15B 2211/851;

(Continued)

(56) References Cited

U.S. PATENT DOCUMENTS 6,098,967 A * 8/2000 Folchert ............... B60G 17/052 267/64.11
7,000,332 B1 * 2/2006 Fresch ............... B01D 53/0446 34/330

(Continued)

FOREIGN PATENT DOCUMENTS

DE 3042069 A1 6/1982
DE 8109217 U1 5/1985

(Continued)

OTHER PUBLICATIONS

Machine Translation of EP2829744 from espacenet.com; retrieved Jun. 2019. (Year: 2019).*

(Continued)

*Primary Examiner* — Jessica Cahill

(74) *Attorney, Agent, or Firm* — Barnes & Thornburg LLP

(57) ABSTRACT

The invention relates to a compressed air preparation device for rail vehicles or utility vehicles, comprising a compressed air inlet, to which an air compressor can be connected, a compressed air outlet, which is connected to the compressed air inlet via a compressed air duct, and an air drying device arranged in the compressed air duct. In the event that the air compressor is switched off, the compressed air duct is vented upstream of the air drying device so that, at restart, (Continued)

the air compressor can start against a reduced counterpressure.

14 Claims, 1 Drawing Sheet

(51) Int. Cl.
*F04B 53/06* (2006.01)
*F15B 21/044* (2019.01)
*F04B 49/06* (2006.01)

(52) U.S. Cl.
CPC ............ *F04B 53/06* (2013.01); *F15B 21/044* (2013.01); *F15B 2211/615* (2013.01); *F15B 2211/851* (2013.01); *F15B 2211/853* (2013.01); *F15B 2211/8855* (2013.01)

(58) Field of Classification Search
CPC ........ F15B 2211/853; F15B 2211/8855; B60T 17/004; F04B 49/065; F04B 53/06
See application file for complete search history.

(56) References Cited

U.S. PATENT DOCUMENTS

| | | | | |
|---|---|---|---|---|
| 7,279,026 | B1 * | 10/2007 | Fresch | B01D 53/04 95/124 |
| 8,425,673 | B2 * | 4/2013 | Burke | B01D 53/0454 55/DIG. 17 |
| 9,694,801 | B2 | 7/2017 | Frank et al. | |
| 2010/0074764 | A1 * | 3/2010 | Schnittger | B60T 17/004 417/53 |
| 2012/0153711 | A1 * | 6/2012 | Minato | B60T 13/662 303/10 |
| 2014/0237962 | A1 * | 8/2014 | Ginder | B01D 53/261 55/420 |
| 2015/0251645 | A1 * | 9/2015 | Pfefferl | B60T 17/004 95/21 |
| 2017/0129300 | A1 * | 5/2017 | Frank | F15B 21/005 |

FOREIGN PATENT DOCUMENTS

| | | | |
|---|---|---|---|
| DE | 19724747 | C1 | 6/1998 |
| DE | 102006043863 | A1 | 4/2008 |
| DE | 102010018949 | A1 | 11/2011 |
| DE | 102010054063 | A1 | 6/2012 |
| DE | 102010054712 | A1 | 6/2012 |
| DE | 102014009432 | A1 | 12/2015 |
| DE | 102014010956 | A1 | 12/2015 |
| EP | 0051760 | A1 | 5/1982 |
| EP | 0199948 | A1 | 11/1986 |
| EP | 2829744 | A2 | 1/2015 |
| JP | 2012140107 | A | 7/2012 |
| JP | 2014139079 | A | 7/2014 |
| RU | 2254249 | C2 | 6/2005 |

OTHER PUBLICATIONS

Search Report and Written Opinion for International Patent Application No. PCT/EP2016/075889; dated Mar. 15, 2017.

Indian Office Action corresponding to 201837016157, dated Nov. 17, 2019.

Japanese Office Action corresponding to 2018-522675, dated Dec. 5, 2019.

* cited by examiner

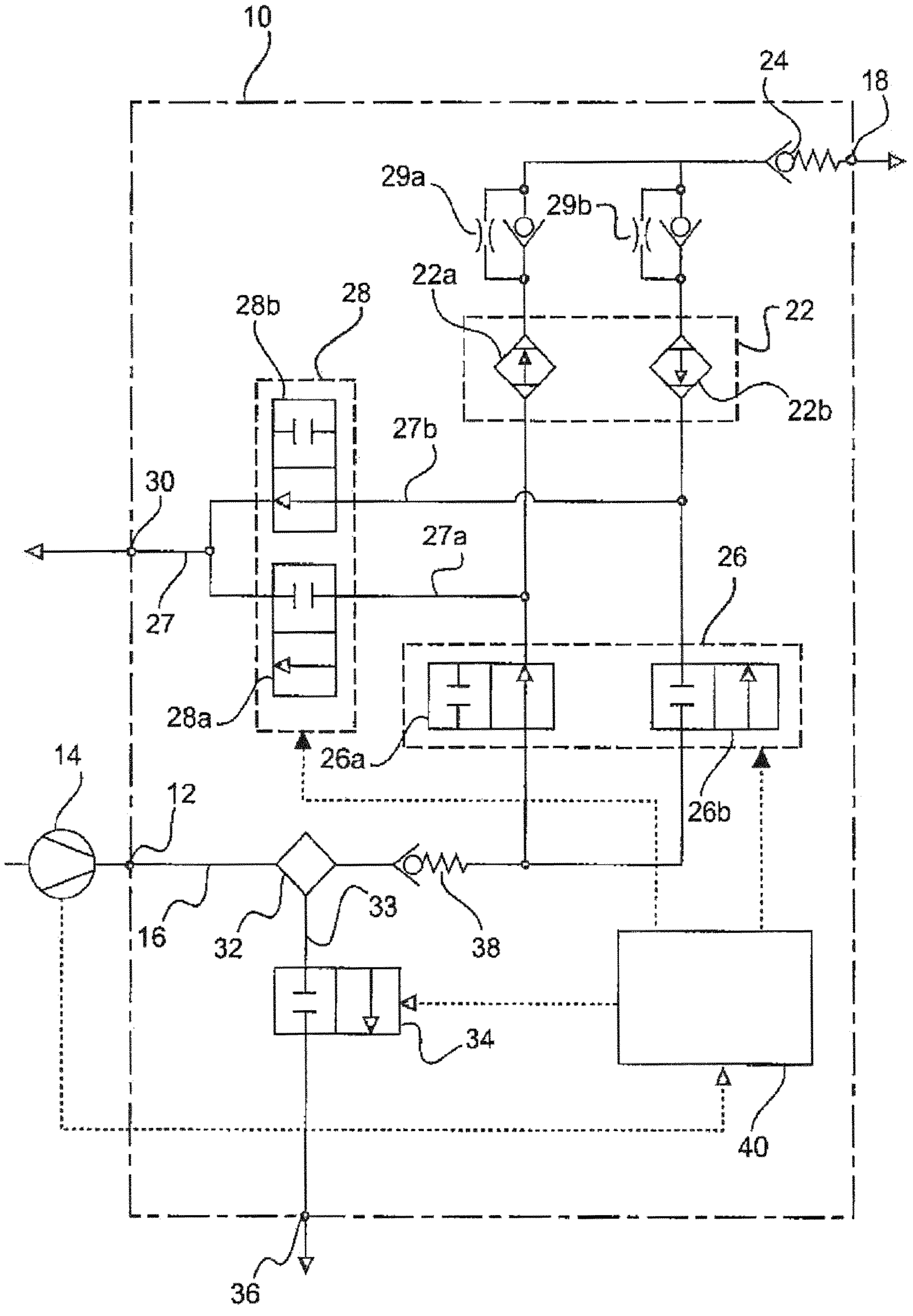
10
24
18
29a
29b
22a
28
28b
22
22b
27b
30
27a
26
27
28a
26a
14
12
26b
16
32
33
38
34
40
36

COMPRESSED AIR PREPARATION DEVICE AND METHOD FOR OPERATING SAME

PRIORITY CLAIM

This patent application is a U.S. National Phase of International Patent Application No. PCT/EP2016/075889, filed 27 Oct. 2016, which claims priority to German Patent Application No. 10 2015 118 744.2, filed Nov. 2, 2015, the disclosure of which being incorporated herein by reference in their entireties.

FIELD

Disclosed embodiments relate to a compressed air preparation device, in particular a compressed air preparation device for rail vehicles or commercial vehicles, and to a method for operating a compressed air preparation device of this type.

BACKGROUND

Compressed air supply devices perform numerous tasks in rail vehicles and commercial vehicles. These include, in particular, the supply of the brake system and further compressed air consumers with dry purified compressed air. The compressed air which is used by the compressed air consumers is provided primarily by a compressor and is usually prepared in a compressed air preparation device. During the preparation, the compressed air is dried, and oil and dirt particles are removed from the compressed air before it is fed to the compressed air consumers.

During starting up of compressors against pressure, high moments have to be overcome. As a result, great mechanical loads can be produced and, in particular, the drive of the compressor has to be of sufficiently great dimensions. Specifically at low temperatures, in the case of an insufficient design, the problem can occur that the compressor does not start up against the pressure. In the case of oil-lubricated compressors, furthermore, the problem can exist that, during starting up under load, the lubrication is not yet sufficient. In order to prevent starting up under load, it is desirable to lower the pressure at the outlet of the compressor after shutdown to such an extent that the compressor can start without a back pressure or only with a reduced back pressure during restarting.

In this context, for example, DE 10 2006 043 863 A1 and DE 30 42 069 A1 in each case disclose a compressor with an integrated venting apparatus, in order that the compressor can start up as far as possible without back pressure.

Furthermore, for example, DE 81 09 217 U1 and DE 10 2010 054 712 A1 in each case disclose a compressed air supply device, the compressed air line of which between the compressor and the air dryer can be vented via an additionally provided venting line with an additionally provided venting valve device, in order to make starting up of the compressor as far as possible without back pressure possible.

SUMMARY

Disclosed embodiments provide an improved compressed air preparation device and an improved method for operating a compressed air preparation device, by way of which venting of the compressed air line is possible without additional valve devices, in order to make starting up, with as little back pressure as possible, of an air compressor which is connected on the inlet side possible.

The compressed air preparation device according to disclosed embodiment has a compressed air inlet, to which an air compressor can be connected; a compressed air outlet which is connected via a compressed air line to the compressed air inlet; and an air drying device which is arranged in the compressed air line. In accordance with the disclosed embodiments, in addition, a control device is provided which is configured to vent the compressed air line upstream of the air drying device when the air compressor is switched off.

In the case of the method according to the disclosed embodiments for operating a compressed air preparation device which has a compressed air inlet, to which an air compressor can be connected, a compressed air outlet which is connected via a compressed air line to the compressed air inlet, and an air drying device which is arranged in the compressed air line, the compressed air line is vented upstream of the air drying device when the air compressor is switched off.

In accordance with the present invention, it is proposed to vent the compressed air line of the compressed air preparation device upstream of the air drying device by means of a control device of the compressed air preparation device, via outlets and valves which are present in any case, when the air compressor is switched off. The compressed air preparation device of the invention does not require any additional elements for the venting. Moreover, rapid and comprehensive venting of the compressed air line is possible. As a result, starting up substantially without back pressure of the air compressor which is coupled to the compressed air preparation device can be achieved. Here, the venting of the compressed air line takes place in accordance with the disclosed embodiments when the air compressor is switched off, in particular as soon as the air compressor has come to a standstill.

In this context, the terms “upstream” and “downstream” relate to the flow direction of the compressed air in the drying mode of the air drying device. During the regeneration mode of the air drying device or a part of the air drying device, the flow direction is reversed at least in part of the compressed air preparation device.

The compressed air line upstream of the air drying device can first of all be vented further or remain vented when the air compressor is switched on again. Starting up and running up of the air compressor can thus be made possible without an appreciable back pressure, that is to say only counter to a back pressure which is generated by way of the outflow losses. The venting can be carried out for a predefined time duration after the air compressor is started, until a predefined rotational speed of the air compressor is reached, or the like.

In one advantageous refinement of the disclosed embodiments, the compressed air preparation device has a venting outlet for a regeneration mode of the air drying device, which venting outlet is connected via a venting line to the compressed air line upstream of the air drying device. In addition, an outlet valve device may be provided in the venting line.

In this refinement, the compressed air line may be vented via the venting outlet when the air compressor is switched off. In this refinement, the outlet valve device may be opened when the air compressor is switched off. If the outlet valve device has a plurality of outlet valves, at least one of the outlet valves is opened for venting purposes.

If, in addition, an inlet valve device is provided in the compressed air line upstream of the air drying device in this refinement, the inlet valve device may be opened when the air compressor is switched off. The inlet valve device may serve to switch over between a normal mode or drying mode and a regeneration mode of the air drying device. If the inlet valve device has a plurality of inlet valves, at least one of the inlet valves is opened for venting purposes.

In a further advantageous refinement of the disclosed embodiments, furthermore, the compressed air preparation device has a prefilter device in the compressed air line upstream of the air drying device, which prefilter device is connected via a discharge line to a discharge outlet. In addition, a discharge valve device may be provided in the discharge line of the prefilter device.

In this refinement, the compressed air line may be vented via the discharge outlet when the air compressor is switched off.

In this refinement, the discharge valve device may be opened when the air compressor is switched off. If the discharge valve device has a plurality of discharge valves, at least one of the discharge valves is opened for venting purposes.

The venting of the compressed air line can optionally take place via the venting outlet for the regeneration mode of the air drying device, via the discharge outlet of the prefilter device, or else both via the venting outlet and the discharge outlet.

In a further advantageous refinement of the disclosed embodiments, the compressed air preparation device has at least one check valve which is selected from a check valve in the compressed air line downstream of the air drying device and a check valve in the compressed air line downstream of the prefilter device. A check valve of this type is intended to prevent a return flow of the compressed air out of the compressed air system which is connected to the compressed air preparation device.

A compressed air supply device having an above-described compressed air preparation device of the disclosed embodiments and an air compressor which is connected or can be connected to the latter is also the subject matter of the disclosed embodiments.

The above and further advantages, features and possible applications of the disclosed embodiments will become more readily comprehensible from the following description of one exemplary embodiment using the appended drawing. In the drawing, the single FIG. 1 for the most part diagrammatically shows the construction of a compressed air supply device in accordance with one exemplary embodiment.

With reference to FIG. 1, the construction and method of operation of the compressed air supply device in accordance with one exemplary embodiment will be described in greater detail. Here, some further components such as filters, valves, throttles, sensors, etc. which are typically present in a compressed air supply device of this type have been omitted in FIG. 1 for the sake of simplicity, but do not appear to be necessary for the comprehension of the disclosed embodiments.

The compressed air supply device has a compressed air preparation device 10 and an air compressor 14 which is connected to it, for example in the form of a compressor. The compressed air preparation device 10 has a compressed air inlet 12 which can be coupled to the air compressor 14 and which is connected via a compressed air line 16 to a compressed air outlet 18. One or more compressed air consumers can be connected to the compressed air outlet 18.

The compressed air which is conveyed from the compressed air inlet 12 via the compressed air line 16 is dried in an air dryer and may also be purified, in particular of oil, soot and dirt particles which were already contained in the air or have been introduced during the compression process in the air compressor 14. To this end, the air dryer has an air drying device 22 and different inlet and outlet valve devices 26, 28. In the exemplary embodiment of FIG. 1, the air drying device 22 has a first drying container 22*a* and a second drying container 22*b* which are arranged parallel to one another in terms of the flow. In each case one parallel circuit comprising a check valve and a regeneration nozzle or throttle 29*a*, 29*b* is provided downstream of the drying containers 22*a*, 22*b*.

A check valve 24 is arranged downstream of the air drying device 22 in the compressed air line 16. The check valve 24 is intended to prevent compressed air from flowing back into the compressed air preparation device 10 from the compressed air system which is connected to the compressed air outlet 18.

An inlet valve device 26 is arranged upstream of the air drying device 22 in the compressed air device 16. In accordance with the two drying containers 22*a*, 22*b* of the air drying device 22, the inlet valve device 26 has a first inlet valve 26*a* upstream of the first drying container 22*a* and a second inlet valve 26*b* upstream of the second drying container 22*b* in this exemplary embodiment.

In other embodiments, the air drying device 22 can also comprise only one drying container or more than two drying containers.

A venting line 27 branches off from the compressed air line 16 between the inlet valve device 26 and the air drying device 22. In the exemplary embodiment of FIG. 1, the venting line 27 has a first venting branch line 27*a* which is coupled to the first drying container 22*a* of the air drying device 22, and a second venting branch line 27*b* which is coupled to the second drying container 22*a*. The venting line 27 is connected to a venting outlet 30 of the compressed air preparation device 10.

In addition, an outlet valve device 28 is arranged in the venting line 27. In the exemplary embodiment of FIG. 1, the outlet valve device 28 has a first outlet valve 28*a* which is arranged in the first venting branch line 27*a*, and a second outlet valve 28*b* which is arranged in the second venting branch line 27*b*.

The inlet valve device 26 and the outlet valve device 28 are actuated by a control device 40 which is integrated into the compressed air preparation device 10 or is connected to the latter.

In the case of a running air compressor 14, compressed air is provided in the compressed air line 16, which compressed air is conveyed to the compressed air outlet 18. The control device 40 may control the two inlet valves 26*a*, 26*b* of the inlet valve device 26 in opposite directions to one another, with the result that the two drying containers 22*a*, 22*b* of the air drying device 22 are flowed through by compressed air in an antiparallel manner. The one drying container (the first drying container 22*a* in the operating state of FIG. 1) is thus operated for drying the compressed air in the normal mode, whereas the other drying container (the second drying container 22*b* in the operating state of FIG. 1) is operated in the regeneration mode. The two outlet valves 28*a*, 28*b* of the outlet valve device 28 may likewise be actuated by the control device 40 in opposite directions to one another, the first outlet valve 28*a* being closed when the first inlet valve 26*a* is open and vice versa, and the second outlet valve 28*b* being opened when the second inlet valve 26*b* is closed and vice versa.

In the operating state which is shown in FIG. 1, the first inlet valve 26*a* of the inlet valve device 26 is open, with the result that the compressed air which is provided by the air compressor 14 flows through the first drying container 22*a* of the air drying device 22 and is then made available at the compressed air outlet 18. A part of the compressed air which is purified and dried in the first drying container 22*a* is branched off and is guided back via the second regeneration nozzle 29*b* through the second drying container 22*b* of the air drying device 22, in order to regenerate the desiccant in the second drying container 22*b*. The compressed air is then output via the second venting branch line 27*b* through the open second outlet valve 28*b* to the venting outlet 30. Subsequently, the switching states of the inlet and outlet valve devices 26, 28 are changed by the control device 40, with the result that the compressed air in the second drying container 22*b* of the air drying device 22 is purified and dried, whereas the desiccant in the first drying container 22*a* is regenerated.

In order to prevent it from being necessary for the air compressor 14 to operate against a high pressure in the compressed air line 16 during starting up or restarting, the compressed air line 16 of the compressed air supply device is vented as rapidly and completely as possible when the air compressor 14 is switched off, for example, as soon as the air compressor 14 comes to a standstill. No additional elements are required for this measure; rather, in a special venting mode, the control device 40 actuates the inlet and outlet valve devices 26, 28 which are present in any case in the compressed air preparation device 10. In the venting mode, for example, all the inlet valves 26*a*, 26*b* of the inlet valve device 26 and all the outlet valves 28*a*, 28*b* of the outlet valve device 28 are opened, or the first inlet valve 26*a* and the first outlet valve 28*a* are opened, or the second inlet valve 26*b* and the second outlet valve 28*b* are opened, with the result that the compressed air in the compressed air line 16 can escape via the venting line 27 to the venting outlet 30.

In the case of restarting of the air compressor 14, the inlet and outlet valves 26, 28, for example, first of all remain in the venting operating state or are set temporarily into the venting operating state again. The starting up of the air compressor 14 thus takes place only against the back pressure which is generated by way of the outflow losses, but not against a back pressure which is built up by way of the generated compressed air in the compressed air line 16. The venting operating state is actuated, for example, until a predefined time duration since the starting up of the air compressor 14 has elapsed or until the air compressor 14 reaches a predefined rotational speed.

The control device 40 of the compressed air preparation device 10 receives the information about the operating state of the air compressor 14, for example, directly from the air compressor 14, its actuation means or else from a vehicle controller.

In the exemplary embodiment of FIG. 1, furthermore, a prefilter device 32 for the prefiltering of the compressed air is arranged in the compressed air line 16 upstream of the air drying device 22 and the inlet valve device 26, that is to say upstream of the air dryer. The prefilter device 32 is intended, for example, to separate liquids and vapors before the entry of the compressed air into the air dryer.

The prefilter device 32 is connected via a discharge line 33 to a discharge outlet 36, in order to regularly discharge the liquids (for example oil, water, etc.) which are deposited in the prefilter device 32. For this purpose, a discharge valve device 34 is additionally arranged in the discharge line 33, which discharge valve device 34 is likewise actuated by the control device 40.

As shown in FIG. 1, moreover, a further check valve 38 is provided in the compressed air line 16 between the prefilter device 32 and the air dryer.

As an alternative or in addition to the above-described venting operation of the compressed air line 16, venting of the compressed air line 16 can also take place via the prefilter device 32 without the use of additional elements. If the venting is intended to be effected solely via the prefilter device 32, the control device 40 closes the two inlet valves 26*a*, 26*b* of the inlet valve device 26 and opens the discharge valve device 34. If the venting of the compressed air line 16 is to be effected via the venting outlet 30 and the discharge outlet 36, the control device 40 opens the two inlet valves 26*a*, 26*b* of the inlet valve device 26, the two outlet valves 28*a*, 28*b* of the outlet valve device 28, and the discharge valve device 34.

The dewatering of the prefilter device 32 after a shutdown of the air compressor 14 is additionally advantageous, in order to prevent freezing at low operating temperatures.

The time sequence of the pressure drop in the compressed air line 16 can additionally optionally be changed or regulated via throttles or nozzles (not shown) in the venting line 27 and/or the discharge line 33.

Disclosed embodiments are not restricted to the above-described exemplary embodiment of FIG. 1. Rather, a person skilled in the art recognizes numerous modifications within the context of the present invention.

For example, the prefilter device 32 can also have a plurality of (for example two) prefilters upstream of the air dryer, which prefilters are arranged one after another in the compressed air line 16 in the flow direction of the compressed air. Accordingly, the discharge line 33 has a first discharge branch line which is connected to the first prefilter, and a second discharge branch line which is connected to the second prefilter. Moreover, in this embodiment, the discharge valve device 34 can have a first discharge valve in the first discharge branch line and a second discharge valve in the second discharge branch line.

Venting of the compressed air line 16 can take place selectively via one of the two discharge branch lines or via all the present discharge branch lines by means of corresponding actuation of the discharge valve device 34 by way of the control device 40.

If the air drying device 22 has only one drying container, only one venting line 27 and one outlet valve device 28 with only one outlet valve in the venting line 27 are accordingly provided. A regeneration line may then be provided parallel to the air drying device 22. In this design variant, the inlet valve device 26 can have one or more inlet valves.

Moreover, within the context of the invention, embodiments are also conceivable, in which a prefilter device 32 with a corresponding discharge valve device 34 and a corresponding discharge outlet 36 can be dispensed with.

LIST OF DESIGNATIONS

10 Compressed air preparation device
12 Compressed air inlet
14 Air compressor, for example compressor
16 Compressed air line
18 Compressed air outlet
22 Air drying device
22*a* First drying container
22*b* Second drying container
24 Check valve
26 Inlet valve device
26*a* First inlet valve

26*b* Second inlet valve
27 Venting line
27*a* First venting branch line
27*b* Second venting branch line
28 Outlet valve device
28*a* First outlet valve
28*b* Second outlet valve
29*a* First regeneration nozzle
29*b* Second regeneration nozzle
30 Venting outlet
32 Prefilter device
33 Discharge line
34 Discharge valve device
36 Discharge outlet
38 Check valve
40 Control device

The invention claimed is:

1. A compressed air preparation device for rail vehicles or commercial vehicles, the device comprising:
- a compressed air inlet, to which an air compressor is connectable;
- a compressed air outlet, which is connected via a compressed air line to the compressed air inlet;
- an air drying device, which is arranged in the compressed air line;
- and an inlet valve device provided in the compressed air line upstream of the air drying device,
- and
- a control device configured to vent the compressed air line upstream of the air drying device and downstream the inlet valve device when the air compressor is switched off.

2. The compressed air preparation device of claim 1, further comprising a venting outlet provided for a regeneration mode of the air drying device and connected via a venting line to the compressed air line upstream of the air drying device,
- wherein the control device is configured to vent the compressed air line via the venting outlet when the air compressor is switched off.

3. The compressed air preparation device of claim 2, further comprising an outlet valve device provided in the venting line,
- wherein the control device is configured to actuate the outlet valve device into the open state when the air compressor is switched off.

4. The compressed air preparation device of claim 2
- wherein the control device is configured to actuate the inlet valve device into the open state when the air compressor is switched off.

5. The compressed air preparation device of claim 1, further comprising a prefilter device provided in the compressed air line upstream of the air drying device, wherein the prefilter device is connected via a discharge line to a discharge outlet, and wherein the control device is configured to vent the compressed air line via the discharge outlet when the air compressor is switched off.

6. The compressed air preparation device of claim 5, further comprising a discharge valve device provided in the discharge line of the prefilter device,
- wherein the control device is configured to actuate the discharge valve device into the open state when the air compressor is switched off.

7. The compressed air preparation device of claim 1, further comprising a check valve in the compressed air line downstream of the air drying device and/or a check valve in the compressed air line downstream of the prefilter device.

8. A compressed air supply device comprising:
- a compressed air preparation device including a compressed air inlet, a compressed air outlet, which is connected via a compressed air line to the compressed air inlet, an air drying device arranged in the compressed air line,
- an air compressor connectable to the compressed air inlet of the compressed air preparation device,
- and a control device configured to vent the compressed air line upstream of the air drying device and downstream an inlet valve device when the air compressor coupled to the compressed air inlet is switched off.

9. A method for operating a compressed air preparation device for rail vehicles or commercial vehicles, the compressed air preparation device having a compressed air inlet to which an air compressor is connectable, the method comprising:
- connecting a compressed air outlet via a compressed air line to the compressed air inlet arranging an air drying device in the compressed air line; and
- venting the compressed air line upstream of the air drying device when the air compressor is switched off,
- further comprising first venting the compressed air line further upstream of the air drying device when the air compressor is switched on again subsequent to being switched off.

10. The method of claim 9 wherein the compressed air preparation device has a venting outlet for a regeneration mode of the air drying device, which venting outlet is connected via a venting line to the compressed air line upstream of the air drying device and the compressed air line is vented via the venting outlet when the air compressor is switched off.

11. The method of claim 10, wherein the compressed air preparation device has an outlet valve device in the venting line and the method further comprises opening the outlet valve device when the air compressor is switched off.

12. The method of claim 10, wherein the compressed air preparation device has an inlet valve device in the compressed air line upstream of the air drying device and the method further comprises opening the inlet valve device when the air compressor is switched off.

13. The method of claim 9, wherein the compressed air preparation device has a prefilter device in the compressed air line upstream of the air drying device, wherein the prefilter device is connected via a discharge line to a discharge outlet, and wherein the compressed air line is vented via the discharge outlet when the air compressor is switched off.

14. The method of claim 13, wherein the compressed air preparation device has a discharge valve device in the discharge line of the prefilter device, and wherein the discharge valve device is opened when the air compressor is switched off.

* * * * *